United States Patent [19]

Gueugnon

[11] Patent Number: 4,633,450
[45] Date of Patent: Dec. 30, 1986

[54] OPTICAL FOCUSING APPARATUS FOR THE READING OF A DATA MEDIUM MOVING PAST IT

[75] Inventor: Catherine Gueugnon, Paris, France

[73] Assignee: Cii Honeywell Bull (Societe Anonyme), Paris, France

[21] Appl. No.: 572,016

[22] Filed: Jan. 19, 1984

[30] Foreign Application Priority Data

Jan. 25, 1984 [FR] France .................. 83 01089

[51] Int. Cl.$^4$ .............. G11B 11/00; G11B 7/00
[52] U.S. Cl. .................. 369/13; 360/114; 369/45; 369/46
[58] Field of Search ............ 350/247, 255; 360/114; 369/13, 44, 45, 244, 255; 250/201 DF; 365/215, 122

[56] References Cited

U.S. PATENT DOCUMENTS

| | | | |
|---|---|---|---|
| 3,530,258 | 9/1979 | Gregg et al. | 179/100.3 |
| 3,947,888 | 3/1976 | Jarsen | 360/103 |
| 3,992,576 | 11/1976 | Sugiura | 178/6.6 DD |
| 4,003,059 | 1/1977 | Sugiura et al. | 346/108 |
| 4,475,179 | 10/1984 | Geyer | 369/45 X |
| 4,510,544 | 4/1985 | Lazzan | 360/114 |

OTHER PUBLICATIONS

IBM Technical Disclosure Bulletin, vol. 15, No. 2, Jul. 1972, "Optics for Beam Addressable Files" by R. L. Garwin.
IBM Technical Disclosure Bulletin, vol. 22, No. 3, Aug. 1979, "Video Disk with Updating Feature" by Bruce et al.
Japanese Patent Abstracts Publication, vol. 6, No. 255 (P-162) (1133), Dec. 14, 1982, "Optical Disc Device with Floating Head" by Nippon.

Primary Examiner—Aristotelis M. Psitos
Attorney, Agent, or Firm—Kerkam, Stowell, Kondracki & Clarke

[57] ABSTRACT

Optical apparatus (DISFOCI1 to DISFOCI4) for focusing a beam of light for reading of a data medium moving past it, comprising, a main body (CPLI1 to CPLI4) disposed to fly above the data medium and at least one optical device (OPFOCI1, OPFOCI2, OPFOCI3, OPFOCI4, OPFOCI5) for focusing of the beam, the optical device being located such that its distance in relation to said medium remains constant. The optical device is placed on the main body and is integral with the movement thereof. The apparatus is adpated for optical reading of magnetic optical data.

16 Claims, 24 Drawing Figures

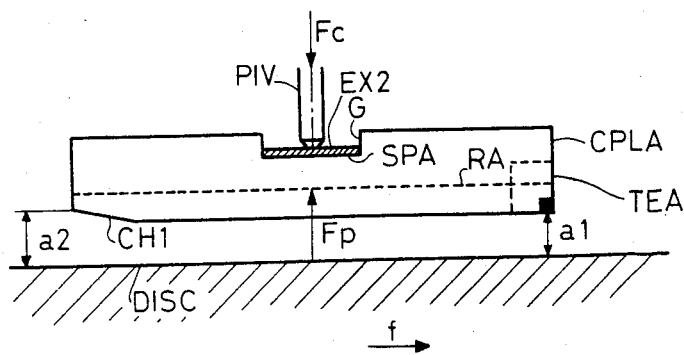
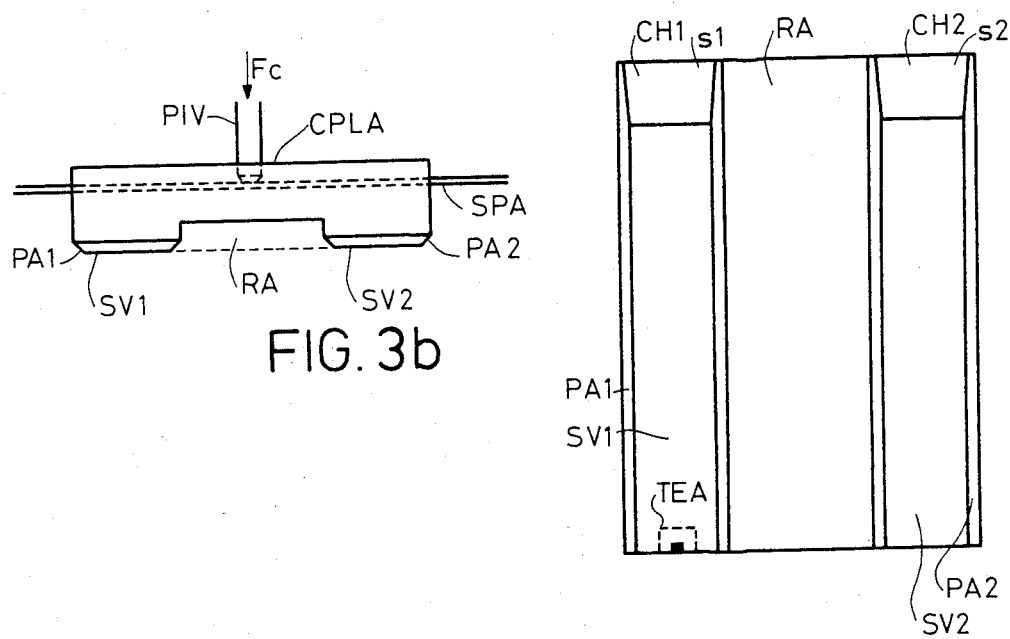
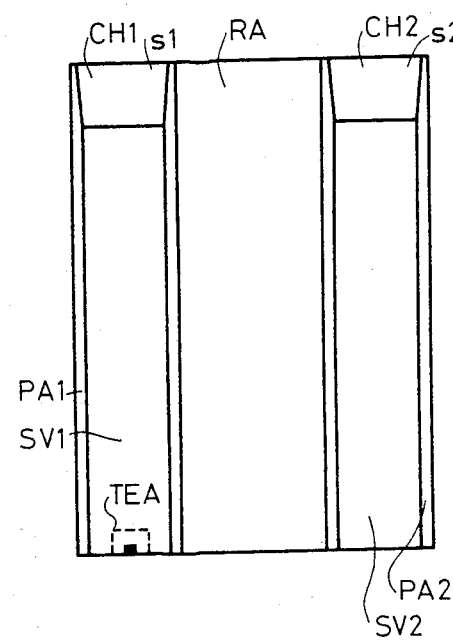
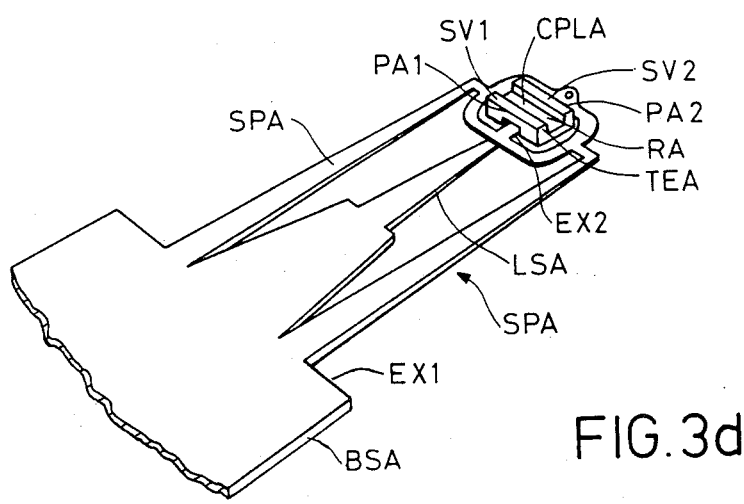
FIG.3a
FIG.3b
FIG.3c
FIG.3d

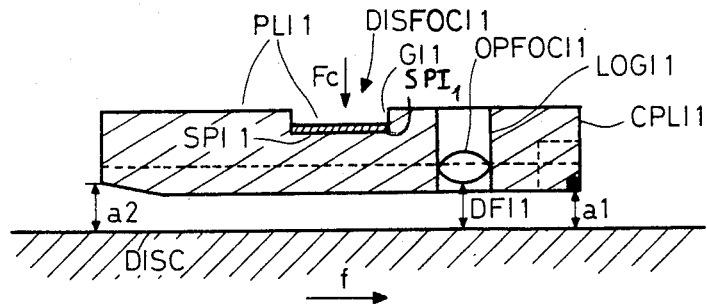
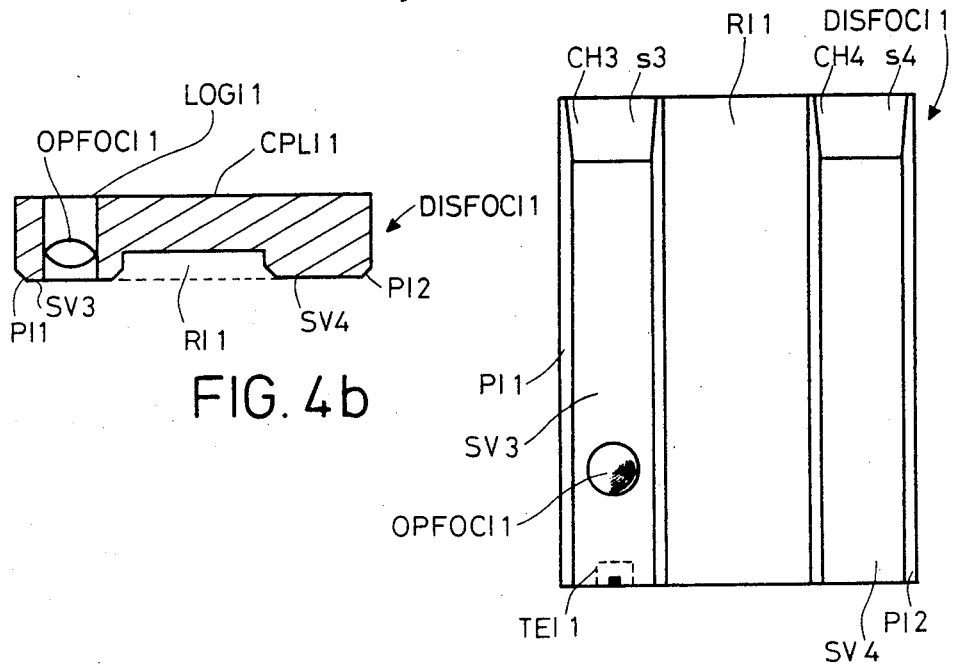
FIG. 4a
FIG. 4b
FIG. 4c
FIG. 4d

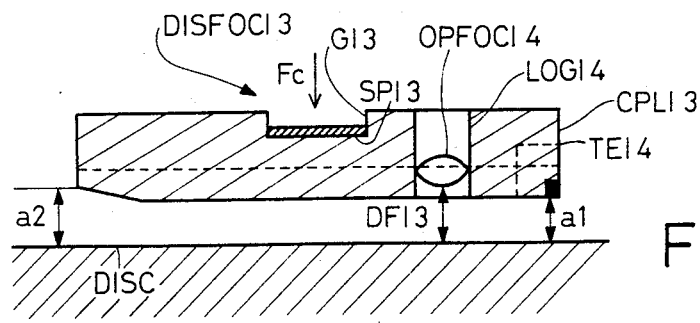
FIG. 6a
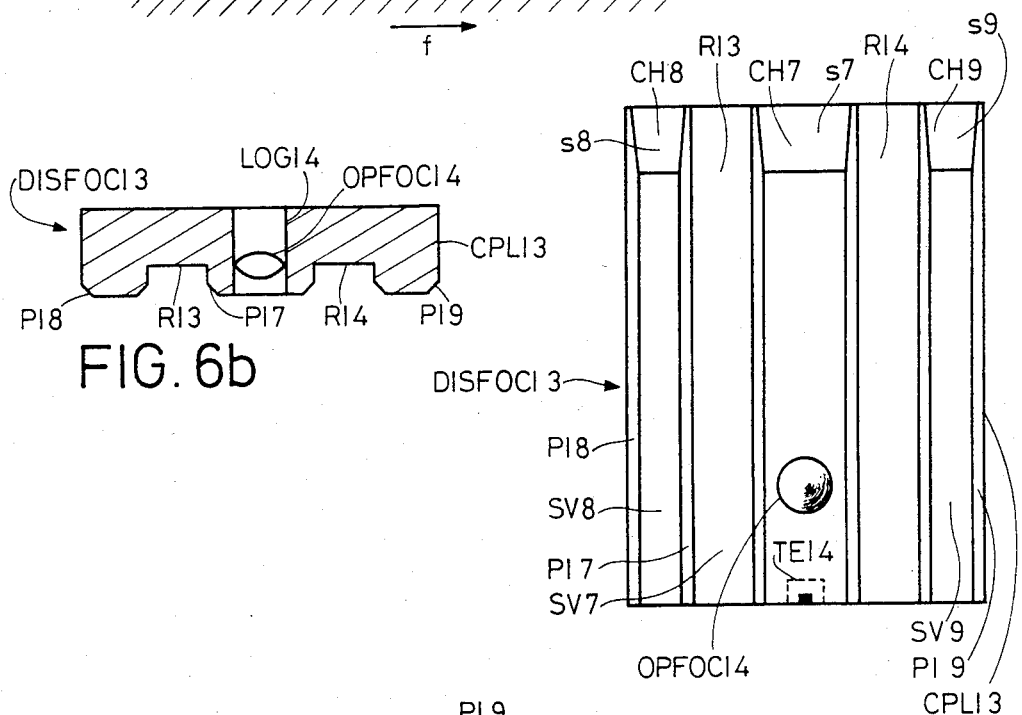
FIG. 6b
FIG. 6c
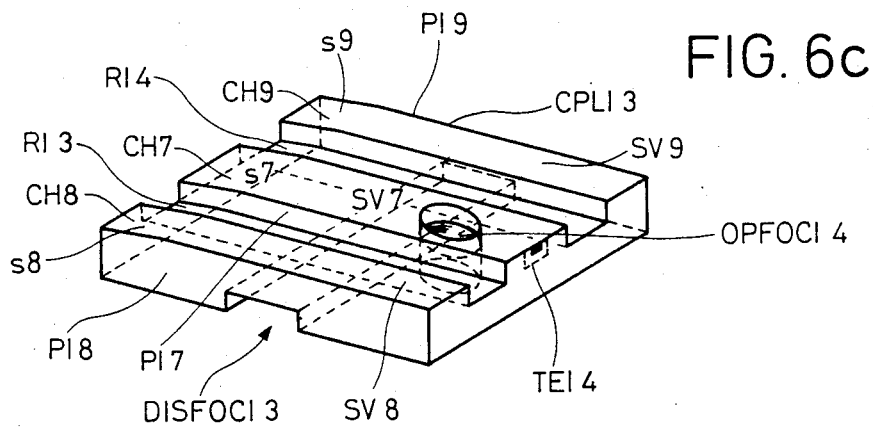
FIG. 6d

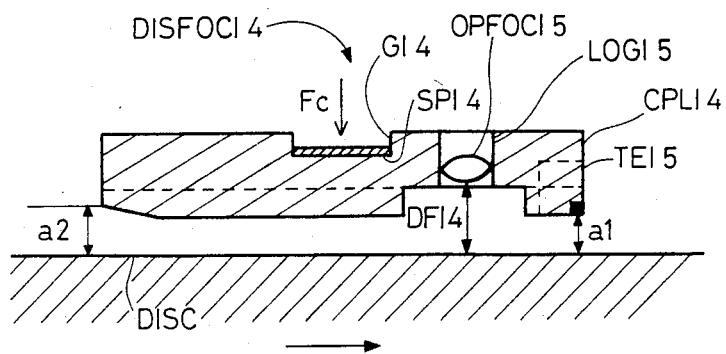
FIG. 7a
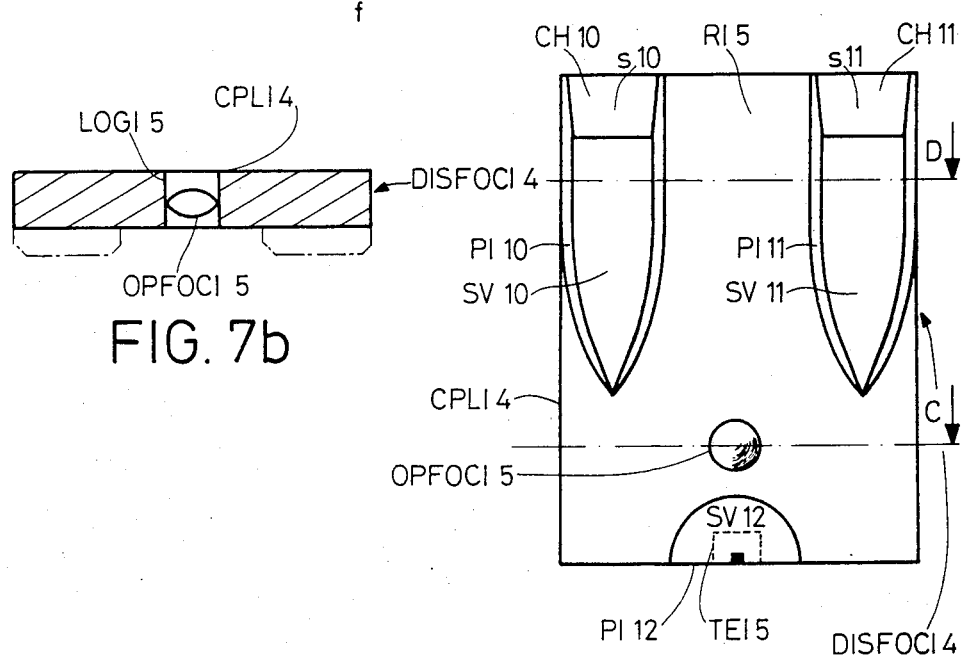
FIG. 7b
FIG. 7c
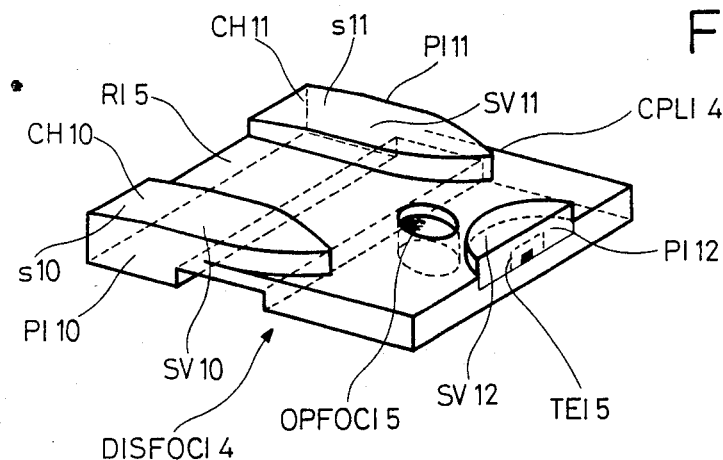
FIG. 7d

OPTICAL FOCUSING APPARATUS FOR THE READING OF A DATA MEDIUM MOVING PAST IT

BACKGROUND OF THE INVENTION

1. Field of the Invention

The present invention relates to an optical focusing apparatus for the reading of a data medium moving past it. More particularly, it is applicable to the reading of data on magnetic discs of magnetooptical storages used mainly in information processing systems.

2. Description of the Prior Art

It is common practice for a user of data processing systems to either immediately use and analyze the result of operations performed by the central processing unit of these systems or to store it for varying periods of time in storages often called bulk storages.

Among bulk storages in current use, magnetic disc storages are frequently employed, including magnetooptical storages. In disc storages, the data is carried by magnetic discs and are stored within concentric recording tracks usually covering the major portion of their two faces.

In general, a sequence of magnetic data stored on the track of a disc offers itself in the form of a succession of small magnetic domains called "elementary domains" distributed throughout the length of the track and which have magnetic inductions of the same module and are of opposite direction.

For the sake of simplicity, the term "transducers" is used to identify the means which enable one to write (or store) the data on the discs or to read data from the disc or to eventually perform one or the other of these two functions. As a rule, one or more transducers are associated with one face of a given disc which moves past the latter.

In the development of magnetic disc storages, one of the current tendencies is to orient oneself toward the study of magnetooptical storages where the data is written on magnetic discs by magnetic or optical means, the reading being effected by a group of optoelectronic means which enable each one of them to observe at a given moment and at a given location one face of a disc by means of a beam of polarized light and to deliver an electrical signal whose voltage or current is dependent upon the value of the data stored at that location.

In these storages, the mode of reading data is based on the principle of interaction between a rectilinear polarized light with the magnetic state of the layer constituting the magnetic disc, said interaction resulting in the rotation of the electric field vector in the plane perpendicular to the direction of propagation.

It is recalled in this context that a light is polarized rectilinearly in the plane when the electric field vector (and, hence, the magnetic induction vector) always maintains the same direction in the plane normal to the direction of propagation of the radiation.

Optical devices for reading data stored on a magnetic medium and which use the interaction principle mentioned hereinabove are known. Such a device is especially described in U.S. application Ser. No. 417,904, filed Sept. 14, 1982, (now U.S. Pat. No. 4,510,544) and corresponding to French Application No. 81.19543 filed on Oct. 16, 1981 by Compagnie Internationale Pour L'Informatique Cii Honeywell Bull, assignee of the invention therein described under the title "Optoelectronic Device for Reading Data Stored on a Magnetic Disc".

More particularly, this optical reading system comprises:

a source of light for transmitting a beam of polarized light over the surface of the disc at a location determined by the latter and whose interaction with the magnetic state of the medium at that location (i.e., with its physical state defined by its magnetic properties) produces a rotation of the plane of polarization of the light, an optical system for focusing the beam of light, having a large field of observation and affording the possibility of observing simultaneously a plurality of tracks and a plurality of data on each track, analyzing means provided with photodetectors (e.g., photodiodes) comprising a light meter to enable the detection of the angle of rotation of said plane and which deliver an electrical signal whose voltage or current is dependent upon the value of the data stored at that location, and means for projecting the image of the surface of the disc which is observed by the focusing lens onto a plane P on which the photodetectors are arranged.

In one preferred embodiment of the optical reading means whose main constituent elements have been noted above, most of these elements are arranged on a moving platform so as to permit the latter to move opposite the tracks of the disc in order to be able to observe all tracks. This platform comprises a supporting arm to which is attached by one of its ends, for example, a moving carriage which lies outside the disc and whose other end is integral with a suspension means carrying a main body, containing, for example, at least one transducer for writing data of the magnetic disc.

For a better understanding of the invention, it will be helpful to review several features of the platforms most frequently used. Generally, but not exclusively, the main body of a platform has the form of a relatively flat rectangular parallelepiped whose first "large face" opposite the disc face contains the writing transducer carried by this main body, the second "large face" substantially parallel to the first face containing the ends of the input and/or output conductors of said transducer.

During the rotation of the disc, a cushion of compressed air is formed between the latter and the first "large face" of the main body which prevents this body from touching and damaging it. The main body is then said to fly above the disc. The distance between the transducer and the face of the disc is called "flight altitude" or "flight height" of the main body. Ordinarily, it is of the order of several tenths of a micron and remains substantially constant during the entire flight of the main body above the disc.

The air cushion exerts a pressure on all or part of the first large face of the main body normal thereto and directed toward its second large face. "Flight surface" is the portion of the first large face subjected to the pressure of the air cushion. The resultant force, called "lift" of the main body, is dependent upon the flight surface. The dynamic equilibrium of the main body in flight is obtained by opposing the lift with an equal and opposite force called "loading force", usually applied to the second large face.

In current practice, platforms known under the trade name "Winchester" are rapidly gaining favor and are being widely applied. These platforms are manufactured by Applied Magnetic Corporation (A.M.C.) under reference numbers 3304 and 3306.

A Winchester-type platform is manufactured in the following manner: One or more grooves, also called slots, are provided on the lower face of its main body having a depth greater than or equal to 30 microns and which can reach up to several tenths of a millimeter. This results in the presence of on said face of several projecting parts called "slides" which usually have the form of skis.

The surface of the slides lying opposite the face of the disc constitutes the flight surface. Since the lift is proportional to said surface, it is obvious that the grooves made in the first large face of the main body, by reducing the flight surface (in relation to a main body which has no grooves), permit the reduction of the flight and, thereby, of the loading force. The latter is relatively small and is of the order of 10 to 20 grams.

Generally speaking, the flight of a main body of a Winchester-type platform above the face of the disc associated therewith is effected in such a way that the surface of the slides is slightly inclined in relation to the face of the disc, thus providing these slides with a lift which is sufficient to ensure a relatively stable flight of the main body.

The assembly made up of the optical system for focusing the beam of light, having a large field of observation, and the main body of the platform is called the optical focusing system. Thus, the latter is an integral part of the optical reading means of the magnetic disc.

One of the principal problems to be solved for any optical focusing system is to focus with a high degree of accuracy the beam of a polarized light transmitted by the light source in such a way as to obtain an extremely clear image of the disc surface. Put differently, this means that the distance between the disc and the optical focusing system must remain constant and substantially equal to the focal distance of said optical systems.

Servo focusing devices exist which enable the solution to the above-mentioned problem. Such a servo focusing means is, for example, described in a paper by Nobutake IMAMURA and Chui Chi OTA entitled "Experimental Study On Magnetooptical Disc Exerciser With Laser Diode And Amorphous Magnetic Films" published in the Japanese Journal of Applied Physics, Volume 29, No. 12, December 1980, pp. 731–734. The object of such a servo focusing device is that, whatever the oscillations of the disc surface may be (the disc surface is never flat and the disc always has a certain radial runout during rotation), the beam of polarized light is always focused accurately.

In such a device, the optical focusing system is mounted on fluid bearings with air and is integral with the moving electrodynamic coil of a linear electromotor. A portion of the reflected beam of light is transmitted by means of a cylindrical lens having a bridge of photodiodes, two of which are located along a vertical axis and the other two are placed along a horizontal axis. It is assumed that the sum of the two signals delivered by the two vertical photodiodes equals A and the sum of the signals delivered by the two horizontal photodiodes equals B. It is the difference between the signals A and B which controls the current flowing through the moving coil of the linear motor that enables the optical focusing system to move. If the beam of light is perfectly focused onto the disc surface, the difference between A and B is zero. Thus, it is inadvisable to move the optical focusing system and no current is sent through the moving coil of the linear electrodynamic motor. On the contrary, when the optical focusing means is too close to the disc surface, the signal A is higher than the signal B and a current is sent through the coil of the motor so that the motor is displaced as the optical focusing system is moved from the disc. On the other hand, when the optical focusing system is too far from the disc, the signal B is higher than the signal A and a current is sent through the coil of the electrodynamic motor so that the optical focusing system comes closer to the disc.

Such servo focusing devices have the disadvantage of being relatively bulky and are thus difficult to mount on a platform such as the one described above. On the other hand, they must be extremely precise and are thus burdensome.

SUMMARY OF THE INVENTION

The present invention overcomes these disadvantages by placing the optical focusing system on the main body of the platform and by making it integral with the movement thereof. One can then say that the optical focusing system takes part in the flight of the main body. Thus, because of the flight conditions of the main body above the disc, which keep the first large face thereof at a constant distance from the disc, by properly arranging the optical focusing means within the main body, the distance between the latter and the disc can be made constant during all the entire flight of the main body above the disc.

According to the invention, the optical means for focusing a beam of light for the reading of a data medium which moves past it comprises, on the one hand, a main body which flies above the data medium, and on the other hand, an optical focusing means arranged in such a way that its distance in relation to the data medium remains constant.

This optical focusing means is characterized by the fact that the optical focusing system is placed on the main body and is integral with the latter's movement.

BRIEF DESCRIPTION OF THE DRAWINGS

Other features and advantages of the present invention will become apparent to one skilled in the art by the ensuing description given by way of non-limitative example with reference to the accompanying drawings, wherein:

FIG. 1 is a preferred embodiment of the device, a large part of which is located on a platform comprising a main body containing a transducer for writing data stored on the magnetic medium;

FIG. 2 shows the image of the surface of the magnetic medium observed by the optical focusing means of the optical reading apparatus such as it is projected onto the plane P where the photodetectors are arranged for reading data stored on the data medium;

FIG. 3 is made up of FIGS. 3a, 3b, 3c and 3d, and illustrates the construction of a platform consisting of a main body and a suspension means;

FIG. 3a is a side view in section taken along a plane perpendicular to the plane of the magnetic medium associated with the main body of the platform and parallel to the direction of movement of the data;

FIG. 3b is a front view;

FIG. 3c is a bottom view; and

FIG. 3d is a fragmentary ¾ perspective view showing the main body of the platform viewed from the surface of the magnetic disc associated with the main body;

FIG. 4, made up of FIGS. 4a, 4b, 4c and 4d, and shows a first embodiment of an optical focusing means according to the invention;

FIG. 4a is a side view in section taken along a plane perpendicular to the plane of the data medium lying opposite the optical means and parallel to the direction of movement of the data;

FIG. 4b is a front view in section;

FIG. 4c is a bottom view; and

FIG. 4d is a ¾ perspective view of the main body of the optical focusing means viewed from the bottom;

FIG. 5 is made up of FIGS. 5a, 5b, 5c and 5d, and shows a second preferred embodiment of the optical observation means according to the invention;

FIG. 5a is a side view in section similar to the cross-sectional view of FIG. 4a;

FIG. 6 is made up of FIGS. 6a, 6b, 6c and 6d, and shows a third preferred embodiment of the optical focusing means according to the invention; FIGS. 6a, 6b, 6c and 6d being similar to the corresponding views of FIGS. 4 and 5.

FIG. 7 shows a fourth preferred embodiment of the optical focusing means according to the invention, FIGS. 7a to 7d being similar to the corresponding views in FIG. 6;

DESCRIPTION OF THE PREFERRED EMBODIMENTS

For a better understanding of the principles of construction and operation of the optical focusing means according to the invention and of the optical reading means which includes this focusing device, reference will first be made to FIGS. 1 and 2, which show a preferred embodiment of an optical device for reading data stored on a magnetic medium such as described in the above-mentioned patent. It will also be helpful to recall the construction and operation of platforms made up of a main body and a suspension device as known from the prior art.

Figure 1:
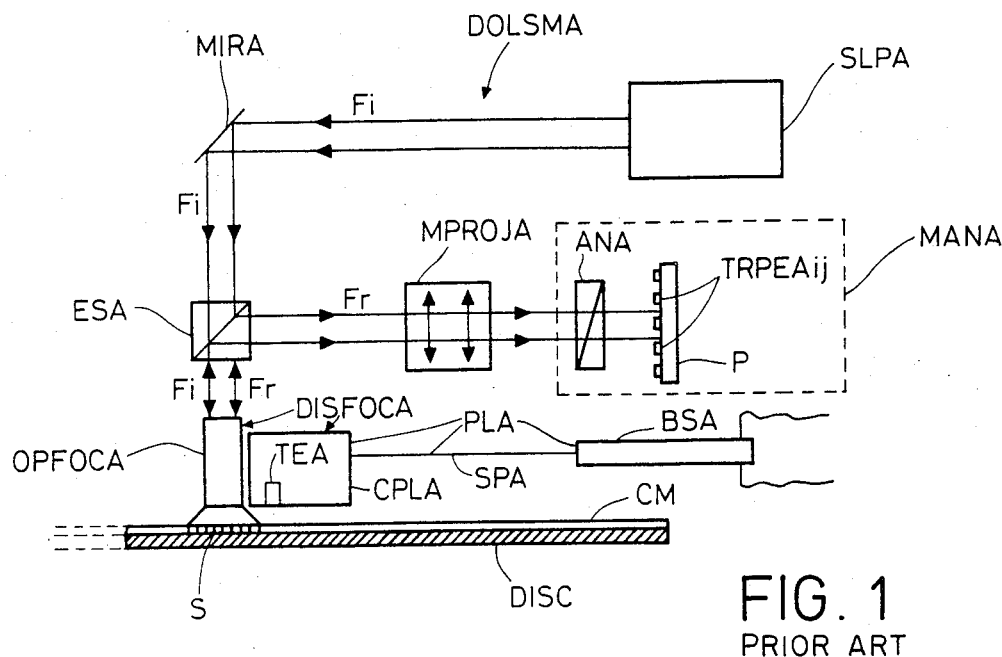
FIGS. 1 and 2 illustrate the principles of construction and operation of an optical means for reading the data stored on a magnetic medium such as described in the above-mentioned U.S. Pat. No. 4,510,544.
Figure 2:
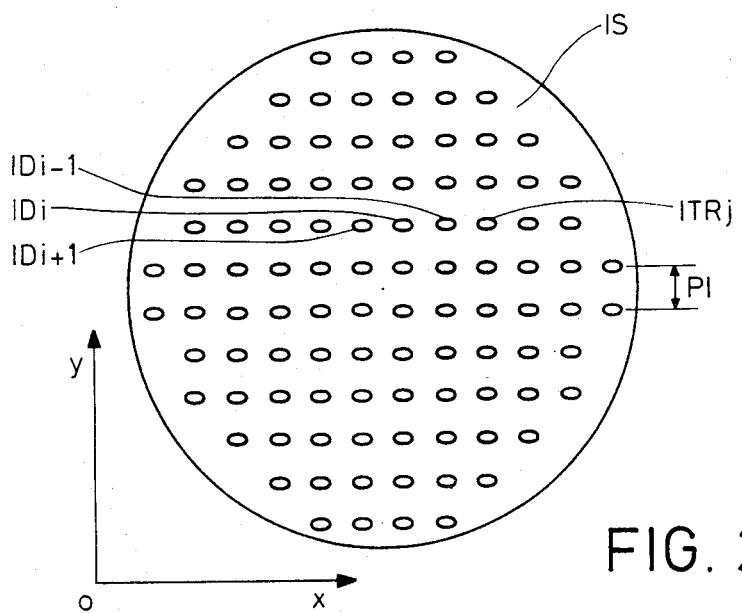

Now, referring to FIG. 1, the various essential constituent elements of the optical reading device of a data medium such as a magnetic disc as shown in FIG. 1 are as follows:

a source of polarized light SLPA, a separator element ESA to separate the incident beam of polarized light sent over the disc from the reflected beam, said two beams being denoted Fi and Fr, respectively, an optical focusing device OPFOCA with a large field of observation which permits the lighting of the magnetic layer CM of the magnetic disc DISC on a surface S in such a way that a plurality of magnetic domains are simultaneously observed within each track, projecting means MPROJA, analyzing means provided with photodetectors MANA, each of which comprise: a light meter ANA, a projection plane P onto which is projected the image of the surface lighted by the beam Fi, said image being obtained by the assembly formed by the optical focusing system OPFOCA and the projection means MPROJA, and a set of photodetectors TRPEAij which delivers a group of electrical signals corresponding to the various magnetic domains of the disc DISC observed within the surface S lighted by the beam of incident light Fi.

The source of polarized light SLPA transmits a relatively monochromatic parallel incident beam of light Fi. The incident beam Fi passes through the separator element ESA and is sent through the focusing optical device OPFOCA normal to the surface of the magnetic layer CM of the disc DISC. Depending upon the enlargement of the optical focusing device OPFOCA, one can observe a surface S having several tens, even several hundreds, of tracks, and several tens, even several hundreds, of magnetic domains within each track. The reflected beam Fr passes successively through the optical device OPFOCA and the separator element ESA, prior to traversing the projection means MPROJA. The reflected beam Fr then passes through the light meter ANA prior to being projected onto the plane P where the photodetectors TRPEAij are arranged.

Thus, one obtains on the plane P an image IF of the surface S viewed through the optical assembly formed by the optical focusing device OPFOCA, the separator element ESA and the projecting means MPROJA. Said image IS is shown in FIG. 2. Thus, it is a real image of the field of data read within the surface A. One can obtain as a function of the enlargement g of the optical assembly made up of the optical devices OPFOCA and the projection means MPROJA light spots that correspond to the magnetic domains contained within the tracks of the disc DISC of the order of several hundreds of a micron in diameter. These spots appear white if they correspond to magnetic domains with a magnetization called "positive" (by convention), and black if they correspond to magnetic domains called "negative" (by convention). The dimension of these light spots is perfectly compatible with the dimensions of the photodetectors used in current practice.

Preferably, a matrix of photodetectors is arranged on the plane and whose lines are parallel to the axis OX, that is to say, parallel to a direction corresponding to the tangent to the tracks of the disc, and those columns are parallel to the axis OY and, hence, to a diameter of the disc. The pitch of the photodetectors along the axis OY is equal to the pitch PI, which is that of the image ITRj of the tracks viewed from the inside of the surface IS (cf. of FIG. 2), while the pitch of the photodetectors along the axis OX corresponds to the distance separating the images IDi from the magnetic domains of each one of the tracks.

The preferred embodiment of the optical reading means of FIG. 1 is for the most part arranged as shown in the same figure, namely, on a moving platform PLA which enables this device to move opposite the group of tracks of the disc so that it can observe all of them. This platform PLA comprises a supporting arm BSA, to which there is attached at one end, for example, a moving carriage outside of the disc DISC (not shown in order not to clutter FIG. 1) and whose other end is integral with a suspension spring SPA which carries a main body CPLA. The latter contains, for example, a transducer for the writing of data on the magnetic disc denoted TEA. As the disc rotates, the main body CPLA flies above the latter at a flight altitude on the order of several tenths of a micron.

The source SLPA is often placed outside the platform and is stationary. It is then necessary to place on the platform PLA a mirror MIRA which receives the beam as shown in FIG. 1 and thereafter sends it to the optical focusing system OPFOCA by means of the separator element ESA.

FIG. 1 shows the relative arrangement chosen for the optical device OPFOCA and the main body CPLA.

Now, referring to FIGS. 3a to 3d, which show the features of the platforms such as PLA, the main body CPLA of the platform PLA has a substantially parallelepipedal shape and presents itself in the form of a catamaran comprising two slides PA1 and PA2 between which a groove RA is placed. The slide PA1 comprises the writing transducer TEA which has a writing air gap E1.

The two slides PA1 and PA2 respectively have on the one hand a main flight surface SV1 and a chamfer CJH1 with a surface s1 and, on the other hand, a main flight surface SV2 and a chamfer CH2 with a surface s2. The total flight surface of the main body CPLA is thus equal to SV=SV2+s1 and SV2+s2.

As can be seen in FIG. 3a, which shows the main body CPLA in flight above the magnetic disc DISC which moves at a constant rate in the first direction of the arrow f, the main body is slightly inclined in relation to the disc surface so that the transducer TEA is located at a flight altitude a1 which is less than the flight altitude a2 of the chamfer CH1 and of the chamfer CH2. The two surfaces SV1 and SV2 have with respect to the surface of the disc an angle which is very small and is of the order of a few milliradians.

If one considers a given point of the disc DISC, it will be seen that the latter moves successively past the chamfers CH1 and CH2, then past the transducer TEA. It is then said that the chamfers CH1 and CH2 lie in front of the flight surface of the main body CPLA and that the transducer TEA lies in back of said same flight surface.

The suspension means SPA is attached to the supporting arm BSA by one if its ends EX1, while its other end EX2 is attached to the main body CPLA within a groove G made, for example, in the second large face (upper face in FIG. 3a) thereof and is perpendicular to the direction of movement of the disc.

As the main body CPLA flies above the disc DISC, an air cushion is formed between the flight surface SV and the disc surface, and which exerts a compressive force Fp on the main body (Fp is the lift) proportional to the flight surface. The dynamic equilibrium is established during the flight of the main body CPLA by applying to the second large face thereof a force Fc by means, for example, of a pivot PIV. Said force Fc, called "loading force", for example, of the order of 10 to 20 grams and is supplied by the blade LSA shown in FIG. 3d. This blade also acts as a spring.

The assembly, formed by the platform PLA and the optical focusing device OPFOCA forms the optical system DISFOCA.

To obtain reliable, i.e., workable, signals with a minimum of errors by logic electronic circuits associated therewith, it is advisable that the image IS of the magnetic domains contained within the surface S be very clear in order to be able to differentiate with ease a black spot from a white spot. This is tantamount to saying that the distance between the surface of the disc and the optical device OPFOCA must remain constant.

Thus, it is extremely difficult to mount on the platform PLA a servo focusing device of the type used in current practice, whose principle is recalled hereinabove.

The present invention allows an extremely simple solution to the problem of the focusing of the incident beam Fi by mounting the optical focusing device on the main body of the platform so that the latter is placed thereon and is integral with its movement. Thus, the optical device takes part in the definition of the flight conditions of the main body.

FIGS. 4 to 7 show various embodiments: DISCOCI1, DISFOCI1, DISFOCI3, DISFOCI4, of the optical focusing system embodying the invention.

Referring to the first embodiment of this system, namely the system DISFOCI1 shown in FIGS. 4a to 4d: the various constituent elements of this system according to the invention include an optical focusing device OPFOCI1 arranged within cylindrical housing LOGI1, and a main body CPLI1 of the platform PLI1 supported by the suspension device SPI1.

The platform PLI1 is identical to the platform PLA shown in FIGS. 3a and 3d. Its main body CPLI1 thus has the form of a catamaran comprising two slides PI1 and PI2 separated by a groove RI1. The slide PI1 contains a writing transducer TEI1.

A groove GI1 is provided in the second large (upper) face of the main body CPLI1. One of the ends of the suspension means SPIP1 is attached to this main body CPLI1 within the groove GI1.

The optical focusing device OPFOCI1 is placed inside a cylindrical housing LOGI1 disposed in the first slide PI1 of the main body CPLI toward the rear thereof, substantially perpendicular to the disc surface.

As the disc DISC, opposite which is located the main body CPLI1, moves at a constant rate past the latter in the direction of the arrow f, the body CPLI1 flies above the disc at a flight altitude a1 at the level of the writing transducer TEI1 and at a flight altitude a2 at the level of the front part of the main body. The optical focusing device OPFOCI1 is mounted between the rear and front part, but closer to the rear as shown in FIGS. 4a, within its housing LOGI1 in such a way that its distance DFI1 in relation to the disc DISC, as the main body flies above the latter, assures the clarity of the image of the surface being observed. This distance is measured between the surface of the optical device lying opposite the disc and the disc itself. Generally one has DFI1≧a1.

It is obvious that in order to assure dynamic equilibrium of the main body CPLI1 as the latter flies above the disc DISC, it is appropriate to provide for the best possible location for the optical device OPFOCI1. This location also assures the best possible rigidity to the main body, making allowance for the presence of the groove Gi1. One sees in this case that the mass of the slide PI1 must equal the mass of the slide PI2. It is clear that the total mass of the main body CPLI1 made with the optical focusing device OPFOCI1 must be compatible with proper flight conditions.

It should be noted that in current practice one encounters optical focusing systems whose mass is of the order of from 1 to 4 grams, which makes the mounting of such an optical system on a main body such as CPLI1 perfectly possible.

Now, referring to FIGS. 5a to 5d which show a second embodiment DISCOCI1 according to the invention, this system comprises two, preferably identical, optical focusing devices OPFOCI2 and OPFOCI3 each of which is installed within its own cylindrical housing LOGI2 and LOGI3, and main body CPLI2 of the platform PLI2 mounted on the suspension means SP12.

The platform PLI2 is of the same type as the platforms PLA and PLI1, that is to say, its main body CPLI2 is a catamaran having two slides PI3 and PI4 between which the groove RI2 is provided. The slide PI3 contains a writing transducer TEI2 whereas the slide PI4 contains the transducer TEI3.

Figure 5B:
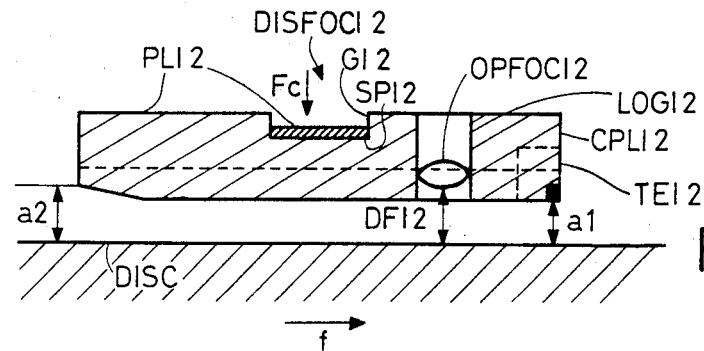
FIG. 5b is a front view in section.
Figure 5B:
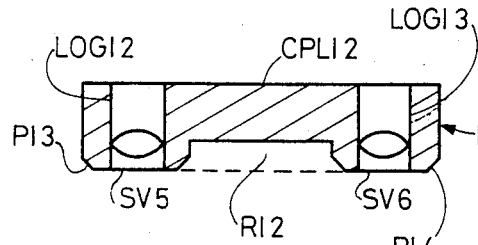
Figure 5C:
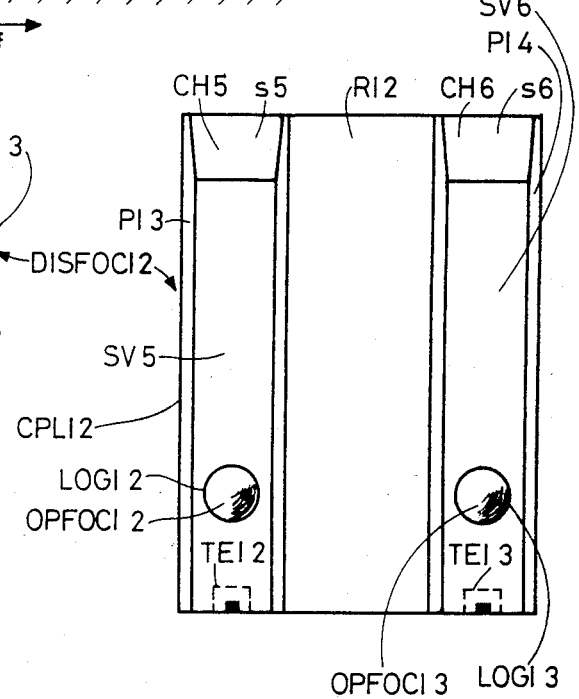
FIG. 5c is a bottom view.
Figure 5D:
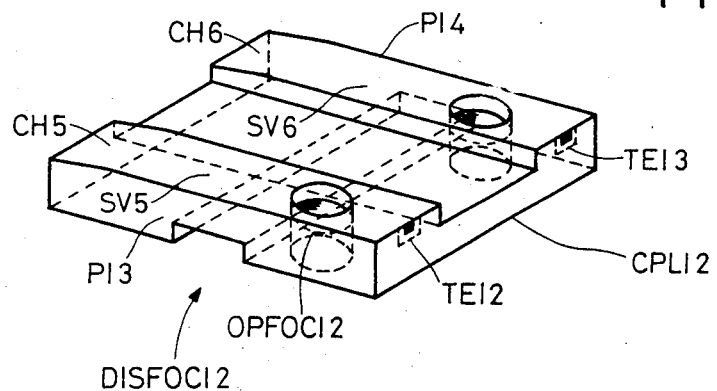
FIG. 5d is a ¾ perspective view from the bottom showing the main body of the optical focusing means.

As can particularly be seen in FIGS. 5b to 5d, the optical focusing devices OPFOCI2 and OPFOCI3 are arranged inside cylindrical housings LOGI2 and LOGI3 provided in slides PI3 and PI4 respectively. Preferably, since the optical focusing devices OPFOCI2 and OPFOCI3 are identical, the housings LOGI2 and LOGI3 must also be identical.

When the main body CPLI2 flies above the disc DISC which moves past it in the direction of the arrow f, its flight altitude is a1 at the level of the transducers TEI2 and TEI3 and a2 at the level of the front part of the main body. The two optical devices are arranged within their respective housing so that, when the main body CPLI2 flies above the disc, the image of the surface being observed is clear. Generally, one has DFI2 ≧ A1.

Obviously, the total mass of the two optical focusing devices is obviously such that the flight conditions of the main body CPLI2 are satisfactory and, for example, identical to those of the platform PLA shown in FIGS. 3a to 3d. This mass is of the order of 1 to 4 grams. Thus, one can simultaneously see two adjacent surfaces of the disc DISC.

Now, referring to FIGS. 6a to 6d showing a third embodiment DISFCOI3 of the optical system according to the invention, the main constituent elements comprise:

a suspension means SPI3, a main body CPLI3 of the platform PLI3 of the trimaran type within which is provided a groove GI3 in which the suspension means SPI3 is located, and an optical focusing device OPFOCI4 located in a housing LOGI4 made within the main body CPLI3.

The main body CPLI3 is a trimaran having three slides, namely a main slide PI7 and two side slides PI8 and PI9.

The central slide PI7 has a main flight surface SV7 and it comprises a writing transducer TEI4 with an air gap EI4, a chamfer CH7 with a flight surface s7. The two side slides PI8 and PI9 are identical and respectively have a main flight surface SV8 and SV9 and chamfers CH8 and CH9 with flight surfaces s8 and s9.

The central slide PI7 is usually larger, that is, has a wider flight surface SV7 and s7, than the side slides SV8 and SV9. It is apparent that the total flight surface of the main body CPLI3 is equal to SV7+SV8+SV9+s7+s8+s9.

The central slide PI7 is separated from the side slides PI8 and PI9 by, respectively, the grooves RI3 and RI4.

The optical focusing device OPFOCI4 is located within a cylindrical housing LOGI4 made in the central slide PI9.

As the main body CPLI3 flies above the disc DISC which, moves past it in the direction of the arrow f, the respective flight altitudes of this main body at the level of the transducers TEI4 and of the front part of the main body are equal to, respectively, a1 and a2.

It is obvious that the mass of the optical device OFOCI4 and the location of its housing LOGI4 are such that they assure satisfactory flight conditions for the trimaran CPLI3 (equilibrium of the main body, position of its center of gravity, position of the main body, in relation to the disc, flight stability). This mass is of the order of 1 to 4 grams as is the case with the optical focusing device OPFOCI1 to OPFOCI3.

The arrangement of the optical device OPFOCI4 within its cylindrical housing is such that during the flight of the main body CPLI3 above the disc DISC its distance DFI3 in relation to the disc is equal to its focal distance and that one has DFI3≧a1. Said distance assures the clarity of the image of the surface being observed.

Now, referring to FIGS. 7a and 7b showing the fourth embodiment DISCOCI4 of the optical system of the invention, this apparatus comprises: suspension means SPI4, main body CPLI4 comprising a groove GI4 where the suspension means SPI4 of the platform PLI4 is located, and optical focusing means OPFOCI5 located within a cylindrical housing LOGI5.

The main body CPLI4 comprises, as is apparent from FIGS. 7c and 7d, two side slides PI10 and PI11 separated by a groove RI5 and a central slide PI12 housing a writing transducer TEI5.

The optical focusing device OPFOCI5 is located within a cylindrical housing LOGI5 disposed in main body CPLI4 and in front of the central slide PI12.

It is apparent that none of the slides, whether they be lateral or central, extends throughout the length of the main body unlike the main bodies shown in FIGS. 4 to 6. The back part of the two side slides PI10 and PI11 has a bevelled shape. Their main flight surfaces are, respectively, SV10 and SV11. They have, extending toward the front part of the platform, respectively, a chamfer CH10 of the flight surface s10 and CH11 of the flight surface s11. The slide PI12 is located in the rear part of the platform and has a flight surface SV12. It is apparent that the total flight surface of the main body CPLI4 is equal to SV10+SV11+SV12+s10+s11.

As the main body CPLI4 flies above the disc DISC moving past it in the direction of the arrow f, the respective flight altitudes of the front and rear parts of CPL14 are a1 and a2.

The mass of the optical device OPFOCI5, the dimensions of the cylindrical housing LOGI5 are such that the flight conditions of the main body CPLI4 are satisfactory and identical to those of the main bodies CPLI1 to CPLI3 shown in FIGS. 4 to 6.

The arrangement of the optical device OPFOCI5 within its housing LOGI5 is such that, as the main body CPLI4 flies above the disc DISC, the distance DFI4 of said optical device in relation to the disc surface assures the clarity of the image of the surface being observed. One has DFI4≧a1.

It is obvious that the location of the housing LOGI5 must be chosen such that the main body CLPI4 remains sufficiently rigid, taking into consideration the presence of the groove GI4.

Considering the optical devices OPFOCI1 to OPFOCI4, and, to a lesser degree, the optical device OPFOCI5, one sees that if the distances DFI1 to DFI3 are close to the flight altitude, i.e., the optical devices OPFOCI1 to OPFOCI4 are flush with the surface, of the slides within which they are located, said optical devices participate directly in defining the aerodynamic flight conditions of the corresponding main bodies.

Conversely, if these different optical devices OP-FOCI1 to OPFOCI5 are such that their distances DFI1 to DFI4 are much greater than a1, said optical devices will participate in defining the flight conditions (equilibrium of the main body, position of its center of gravity, position of the main body in relation to the disc) only through their masses and through the location of the housings in which they are arranged. It will be understood that the invention equally applies to modifications of the focusing means according to the invention such as those in which the mass of the main body is very small, even zero. In this case, it is the optical focusing system itself that flies above the disc DISC.

Figure 8:
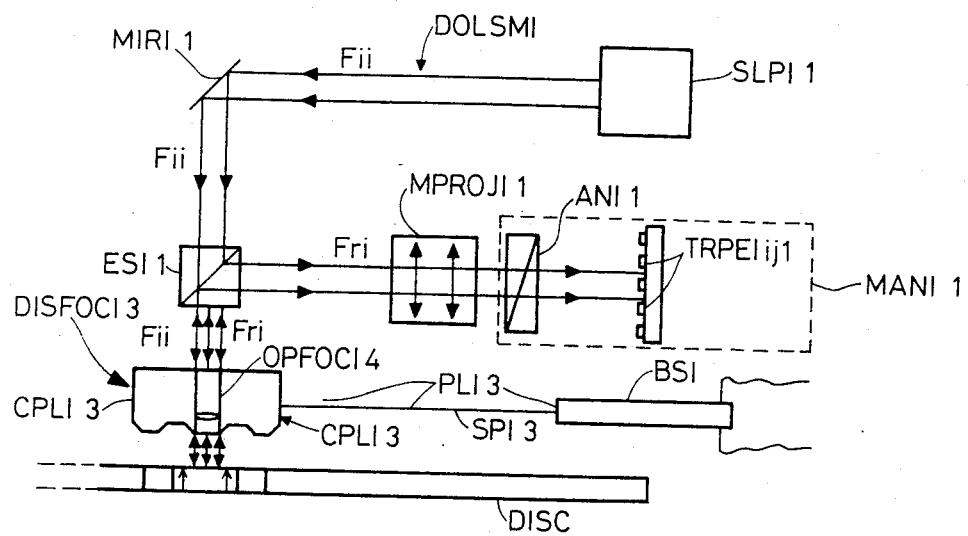
FIG. 8 shows a preferred embodiment of an optical means as taught by the invention for the reading of data stored on a magnetic medium including the optical focusing means shown in FIG. 6.

Now, referring to FIG. 8, there is shown a reading means DOLSMI according to the invention cooperatively associated with a magnetic medium such as a disc DISC and which incorporates a focusing means of the invention, such as the device DISOBSI3. With the exception of the latter, all the constituent elements of the optical reading means DOLSMI of a magnetic medium according to the invention are identical to those of the optical reading means DOLSMA shown in FIG. 1. The operating mode of the device DOLSMI is thus absolutely identical to that of the device DOLSMA.

Thus, the device DOLSMI comprises: a source of polarized light SLPI1 transmitting an incident beam Fii, a mirror MIRI1, a separator element ESI1 to separate the invident beam Fii from the reflected beam Fri, the optical focusing system DISFOCI3 of the invention, the projection means MPROJI1, and the analyzing means with photodectors MANI1.

The elements SLPI1, MIRI1, ESI1, MPROJI1, MANI1 are identical to, respectively, the elements SLPA, MRIA, ESA, MPROJA, MANA of the device DOLSMA of FIG. 1. More particularly, the analyzing means with photodetectors MANI1 comprise a light meter ANI1 and a matrix of photodetectors TRPEIij which are identical to the elements ANA and TRPEAij which are identical to the elements ANA and TRPEAij of the device DOLSMA.

It is obvious that one can design optical means for reading DOLSMI of the magnetic medium according to the invention by incorporating therein optical focusing means such as the optical means DISFOCI1, DISFOCI2, DISFOCI4, shown in, respectively, FIGS. 4, 5, 7 without altering its mode of construction and operation.

Figure 9:
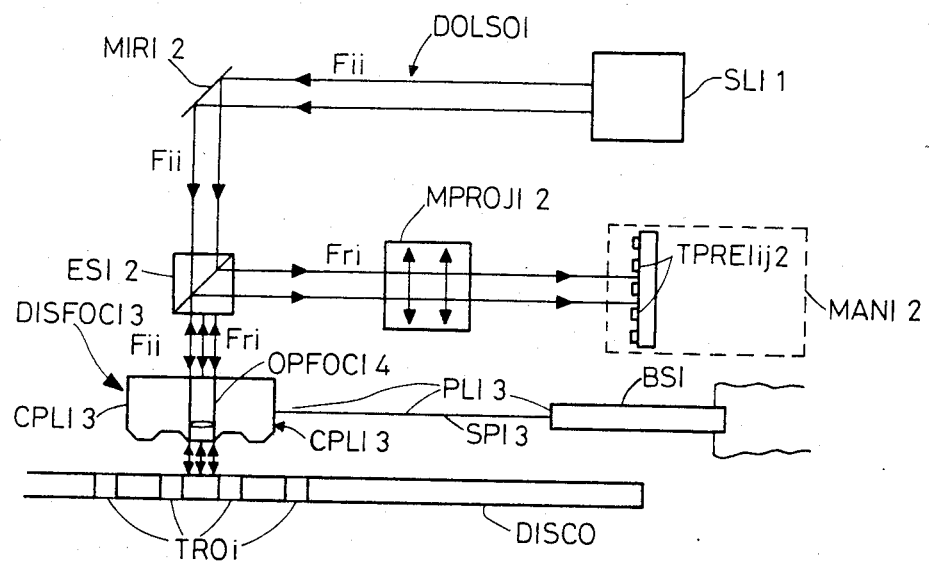
FIG. 9 shows a preferred embodiment of an optical means for reading of data stored on an optical disc according to the invention, said means including the optical focusing device in FIG. 6.

Any optical focusing means taught by the invention, such as one of the optical means shown in FIGS. 4 to 7, can be incorporated in any optical means for reading a data medium DISCO such as that shown in FIG. 9, i.e., the device DOLSOI.

This data medium can, for example, be an "optical disc" whose data are, for example, made up by the presence or the absence of holes TROi made in the disc at given locations. The data can be arranged on tracks as on a magnetic disc. It is recalled that in order to read the data on an optical disc such as the disc DISCO, a beam of light Fii is sent over the surface of the disc DISCO.

In the presence of a hole, the light passes through the disc. If analyzing means with photodetectors are placed on the path of the beam reflected by the disc, they will detect a reflected beam with near-zero intensity. In the opposite case, a refleted beam Fri with non-zero intensity will be absorbed.

Therefore, the optical reading means DOLSOI taught by the invention comprises: a light source SLI1, a mirror MIRI2, a separator element ESI2 to separate the incident beam Fii from the reflected beam Fri, an optical focusing means such as the device DISFOCI3 shown in FIG. 6, projection means MPROJI2 for projecting the image of the holes in the disc onto a plane P where a plurality of photodetectors TRPEIij2 are arranged and analyzing means with photodetectors MANI2 comprising said same photodetectors TRPEIij2.

Obviously, one can obtain optical means for reading the data medium DOLSOI and which incorporates the observation means DISFOCI1, DISOBS0, DISFOCI2, DISFOC13 shown in FIGS. 4, 5, 7 without departing from the framework of the invention.

For example, the elements MIRI2, ESI2, MPROJI2 and TRPEIij2 are identical to the corresponding elements of the device DOLSMI, i.e., the elements MIRI1, ESI1, MPROJI1 and TRPEIij1.

What is claimed is:

1. An optical system for reading data on a surface of a moving data medium, comprising a main body having first and second slides and a groove therebetween, means for supporting the main body to fly above the surface of the data medium such that the distance between the main body and the surface remains constant, and an optical device for focusing a beam of light onto said surface, the optical device being integrally mounted in the interior of the first slide within a housing such that the distance between the optical device and the surface is greater than or equal to a flight altitude of a predetermined location of the main body with respect to said surface.

2. An optical system according to claim 1 further comprising another optical device mounted within the interior of the second slide within another housing, the distance between each of said optical devices and the surface being equal to the focal distance of such optical device and greater than or equal to the flight altitude of the main body at the location of such optical device.

3. An optical system according to claim 1 further comprising a third slide, the second and third slides being disposed along opposite sides of said main body and said first slide being centrally disposed between said second and third slides such that another groove is formed between said first and third slides, and wherein the distance between said optical device and the surface of said medium is equal to the focal distance of said optical device and is greater than or equal to a flight altitude of the main body at the location of said optical device.

4. An optical system for reading data on the surface of a moving data medium, comprising a main body having first and second slides arranged at one end of the main body and having a third slide centrally disposed between the first and second slides and located at an opposite second end of the main body, means for supporting the main body to fly above the surface of the data medium at a constant distance therefrom, and an optical device for focusing a beam of light onto said data medium, the optical device being integrally mounted in the interior of the main body within a housing between said first and second slides and adjacent to said third centrally disposed slide such that the distance between the optical device and the surface of said medium is greater than or equal to a flight altitude of a predetermined location of the main body with respect to said surface.

5. An optical system for reading data stored within a pluraltiy of tracks disposed on the surface of a moving data medium, comprising a light source for transmitting a beam of light onto the surface at a predetermined location thereof, the beam of light interacting with the physical state of the data medium at said location in accordance with the data stored at such location, means for analyzing light reflected from the surface after interaction with the data and for producing electrical signals dependent upon the data stored at such location, a main body having first and second slides with a groove therebetween, means for supporting the main body to fly above the surface of the data medium such that the distance of the main body in realtion to said surface remains constant, and an optical device for focusing said beam of light onto the surface at said location, the focusing device being integrally mounted in the interior of one of said slides within a housing such that the distance between the optical device and the surface is greater than or equal to a flight altitude of a predetermined portion of the main body with respect to said surface.

6. An optical system according to claim 5 further comprising another optical device integrally mounted in the interior of the other one of said slides within another housing, and wherein the distance between each of said optical devices and said surface is equal to the focal distance of such optical device, and said distance is greater than or equal to the flight altitude of the main body at such optical device.

7. An optical system according to claim 5 further comprising a third slide, the second and third slides being disposed at opposite sides of said main body and said first slide being centrally disposed between said second and third slides and spaced from said third slide by another groove, and wherein said distance of the optical device from said surface is equal to the focal distance of said optical device and is greater than or equal to the flight altitude of the main body at said optical device.

8. An optical system for reading data stored within a plurality of tracks on the surface of a moving data medium, comprising a light source for transmitting a beam of light onto the surface at a predetermined location thereof, the beam of light interacting with the physical state of the data medium at said location in accordance with the data stored at such location, means for analyzing light reflected from the surface after interaction with the data and for producing electrical signals dependent upon the data stored at such location, a main body having a first pair of slides arranged at a first end of the main body and another slide centrally disposed between the pair of slides and arranged at an opposite end of the main body, and an optical device arranged in a housing integral with the main body and disposed adjacent to said centrally disposed slide for focusing said light on said surface, the distance between said optical device and the surface being greater than or equal to a flight altitude of a predetermined portion of the main body.

9. An optical system for reading data stored within a plurality of tracks on the surface of a moving magnetic medium, comprising a light source for producing a beam of polarized light, means for focusing the beam onto the surface of the medium at a predetermined location, the light interacting with the magnetic state of the medium at said location so as to produce rotation of the plane of polarization of the light beam reflected from said surface, means for projecting the reflected light onto a plane having detectors arranged thereon, analyzing means responsive to the detectors for detecting the angle of rotation of the plane of polarization of the beam and arranged to deliver an electrical signal dependent upon the value of the data stored at such location, a main body having first and second slides with a groove therebetween, means for supporting the main body to fly above the medium such that its distance in relation to the medium remains constant, and an optical device integrally mounted in the interior of the first slide within a housing, the distance between the optical device and the surface of the medium being greater than or equal to a flight altitude of a predetermined portion of the main body with respect to the surface, said optical device comprising said focusing means and said projecting means.

10. An optical system according to claim 9 further comprising another optical device located within the interior of the second slide within a housing, and wherein the distance between each of the two optical devices and the surface of the medium is equal to the focal distance of such optical device and is greater than or equal to the flight altitude of the main body at such optical device.

11. An optical system according to claim 9 further comprising a third slide, the first slide being centrally disposed between the second and third slides, and wherein the distance between the optical device and the surface of the medium is equal to the focal distance of the optical device and is greater than or equal to the flight altitude of the main body at said optical device.

12. An optical system for reading data stored within a pluraltiy of tracks on the surface of a moving magnetic medium, comprising a light source for producing a beam of polarized light, means for focusing the beam onto the surface of the medium at a predetermined location, the light interacting with the magnetic state of the medium at said location so as to produce rotation of the plane of polarization of the light beam reflected from said surface, means for projecting the reflected light onto a plane having detectors arranged thereon, analyzing means responsive to the detectors for detecting the angle of rotation of the plane of polarization of the beam and arranged to deliver an electrical signal dependent upon the value of the data stored at such location, a main body having a first pair of slides disposed at a first end of the main body and another slide centrally disposed at another end of the main body, means for supporting the main body to fly above the surface of the medium such that the distance between the main body and the surface remains constant, and an optical device mounted in a houisng integral with the main body and disposed between said pair of slides and said centrally disposed slide, the distance between the optical device and the surface being greater than or equal to a flight altitude of a predetermined portion of the main body with respect to said surface, said optical device comprising said focusing means and said projecting means.

13. A platform for reading and writing data on the surface of a moving magnetic medium, comprising a main body having first and second slides and a groove therebetween, means for supporting the main body to fly above the surface of the magnetic medium such that the distance between the main body and the surface remains constant, a magnetic transducer disposed within the first slide for writing data on said surface, and an optical device for focusing a beam of light onto said surface, the opitcal device being integrally mounted in the interior of the first slide within a housing such that the distance between the optical device and the surface is greater than or equal to a flight altitude of a predetermined location of the main body with respect to said surface.

14. A platform according to claim 13 further comprising another magnetic transducer and another optical device mounted within the interior of the second slide, the distance between each of the optical devices and the surface being equal to the focal distance of such optical device and greater than or equal to the flight altitude of the main body at the location of such optical device.

15. A platform according to claim 13, further comprising a third slide, the second and third slides being disposed along opposite sides of said main body and said first slide being centrally disposed between said second and third slides such that another groove is formed between said first and third slides, and wherein the distance between said optical device and the surface is equal to the focal distance of said optical device and is greater than or equal to a flight altitude of the main body at the location of said optical device.

16. A platform for reading and writing data on the surface of a moving magnetic medium, comprising a main body having first and second slides arranged at one end of the main body and having a third slide centrally disposed between the first and second slides and located at an opposite second end of the main body, means for supporting the main body to fly above the surface of the data medium at a constant distance therefrom, a transducer disposed within the third slide for writing data onto the surface of said magnetic medium, and optical device for focusing a beam of light onto said surface, the optical device being integrally mounted in the interior of the main body within a housing disposed between said first and second slides and adjacent to said third centrally disposed slide such that the distance between the optical device and the surface of the medium is greater than or equal to a flight altitude of a predetermined location of the main body with respect to said surface.

* * * * *

UNITED STATES PATENT AND TRADEMARK OFFICE
CERTIFICATE OF CORRECTION

PATENT NO. : 4,633,450

DATED : December 30, 1986

INVENTOR(S) : Gueugnon

It is certified that error appears in the above-identified patent and that said Letters Patent is hereby corrected as shown below:

Column 15, line 4, Change "opitcal" to --optical--.

Column 16, line 14, after "and" insert --an--.

Signed and Sealed this

Seventeenth Day of March, 1987

Attest:

DONALD J. QUIGG

Attesting Officer     Commissioner of Patents and Trademarks